United States Patent [19]
Yoshinaga et al.

[11] Patent Number: 6,116,417
[45] Date of Patent: Sep. 12, 2000

[54] CASE ASSEMBLY

[75] Inventors: Ryoichi Yoshinaga; Masahito Kawashima, both of Higashimurayama, Japan

[73] Assignee: J-Plan Corporation, Tokyo, Japan

[21] Appl. No.: 08/927,659

[22] Filed: Sep. 11, 1997

[30] Foreign Application Priority Data

Jul. 11, 1997 [JP] Japan ................................. 9-186701
Jul. 14, 1997 [JP] Japan ................................. 9-006110

[51] Int. Cl.[7] .................................................. B65D 85/57
[52] U.S. Cl. ................................... 206/310; 206/308.1
[58] Field of Search .............................. 206/217, 308.1, 206/309, 310, 312, 459.1

[56] References Cited

U.S. PATENT DOCUMENTS

| | | | |
|---|---|---|---|
| 4,607,747 | 8/1986 | Steiner | 206/232 |
| 4,750,618 | 6/1988 | Schubert | 206/310 |
| 4,765,465 | 8/1988 | Yamada et al. | 206/217 |
| 4,793,479 | 12/1988 | Otsuka et al. | 206/308.1 |
| 4,847,597 | 7/1989 | Dobosi et al. | 206/459.1 |
| 5,044,037 | 9/1991 | Brown | 206/811 |
| 5,251,750 | 10/1993 | Gelardi et al. | 206/310 |
| 5,275,285 | 1/1994 | Clegg | 206/449 |
| 5,400,902 | 3/1995 | Kaminski | 206/310 |
| 5,402,882 | 4/1995 | Bandy et al. | 206/310 |
| 5,464,092 | 11/1995 | Seeky | 206/217 |
| 5,526,926 | 6/1996 | Deja | 206/310 |
| 5,536,196 | 7/1996 | Sternberg | 206/217 |
| 5,575,383 | 11/1996 | Seeley | 206/217 |
| 5,829,582 | 11/1998 | Ippolito et al. | 206/21 |

*Primary Examiner*—David T. Fidei
*Attorney, Agent, or Firm*—Wenderoth, Lind & Ponack, L.L.P.

[57] ABSTRACT

A CD or CD-ROM case comprises a receiving member and a lid member to be fitted over the receiving member. The receiving member is provided with a piece at its middle position. The piece is formed by arranging slits and projections in a columnar form, and is provided with a pusher to bias a CD or CD-ROM upwardly.

8 Claims, 4 Drawing Sheets

CASE ASSEMBLY

BACKGROUND OF THE INVENTION

The present invention relates to a case assembly designed for encasing therein an article, especially a CD or CD-ROM.

A conventional CD or CD-ROM case comprises a square form receiving member which is provided with a substantially columnar piece at its middle portion. The piece is engaged within a center opening in a CD or CD-ROM so that the CD or CD-ROM can be fixed in place.

The piece is constructed of a plurality of slits and a plurality of projections. To detach the CD or CD-ROM from the piece, a push is given to the tops of the projections to make the widths of the slits narrow, so that the piece is disengaged from within the opening in the CD or CD-ROM. Then, while such disengagement is maintained by pushing the tops of the projections with a finger, the CD or CD-ROM is removed from the case with the outer periphery thereof held by hand. This is an awkward operation.

In some cases, and to avoid such an awkward operation, the CD or CD-ROM is forcibly removed out of the case with the outer periphery thereof held with a hand but without giving the push to the tops of the projections of the piece to make the widths of the slits narrow or disengaging the piece from within the opening in the CD or CD-ROM. In this case, the opening in the CD or CD-ROM is damaged, or the CD or CD-ROM itself is injured.

In view of the problem associated with the prior art, it is therefore an object of the present invention to provide a case assembly at low cost, which ensures that a CD or CD-ROM can be removed therefrom in a one-touch fashion, and is unlikely to cause damage to a center opening in a CD or CD-ROM therein or the CD or CD-ROM itself encased.

SUMMARY OF THE INVENTION

According to one aspect of the present invention, the aforesaid object is achieved by the provision of a case assembly comprising a member for receiving an article and a lid member to be fitted over the receiving member. The receiving member includes at a substantially middle position a substantially columnar piece that is engaged within a center opening in the article to fix the article in place. The piece is formed by arranging a plurality of slits and a plurality of projections in a columnar form, and is provided with a pusher for biasing the article upwardly.

According to another aspect of the present invention, there is provided a case assembly comprising a member for receiving a CD or CD-ROM and a lid member to be fitted over the receiving member. The receiving member includes at a substantially middle position a substantially columnar piece that is engaged within a center opening in CD or CD-ROM to fix the CD or CD-ROM in place. The piece is formed by arranging a plurality of slits and a plurality of projections in a columnar form, and is provided with a round clearance at a middle position thereof. The round clearance is provided with a pusher for biasing the CD or CD-ROM upwardly. The pusher comprises a disc form pusher plate placed on the projections to cover the round clearance. A protuberance extends from a back surface of the pusher plate through any of the slits and terminates at a back surface of any of the projections. A strip extends from the back surface of the pusher plate and is upwardly bent toward a distal end thereof. And a sound generator is attached to the back surface of the pusher plate to generate sound upon being pressed down.

According to still another aspect of the present invention, there is provided a case assembly comprising a member for receiving a CD or CD-ROM and a lid member to be fitted over the receiving member. The receiving member includes at a substantially middle position a substantially columnar piece that is engaged within a center opening in the CD or CD-ROM to fix the CD or CD-ROM in place. The piece is formed by arranging a plurality of slits and a plurality of projections in a columnar form. A pusher is provided at a position of a surface of the receiving member in the vicinity of the piece as an integral part of the surface of the receiving member, the pusher having an upward biasing force sufficient to bias the CD or CD-ROM upwardly.

BRIEF DESCRIPTION OF THE DRAWINGS

By way of illustration alone, but not by way of limitation, preferred embodiments of the present invention will now be explained with reference to the accompanying drawings, in which.

DETAILED EXPLANATION OF THE PREFERRED EMBODIMENTS

Some preferred embodiments of the present invention will now be described at great length with reference to FIGS. 1 to 7.

Figure 1:
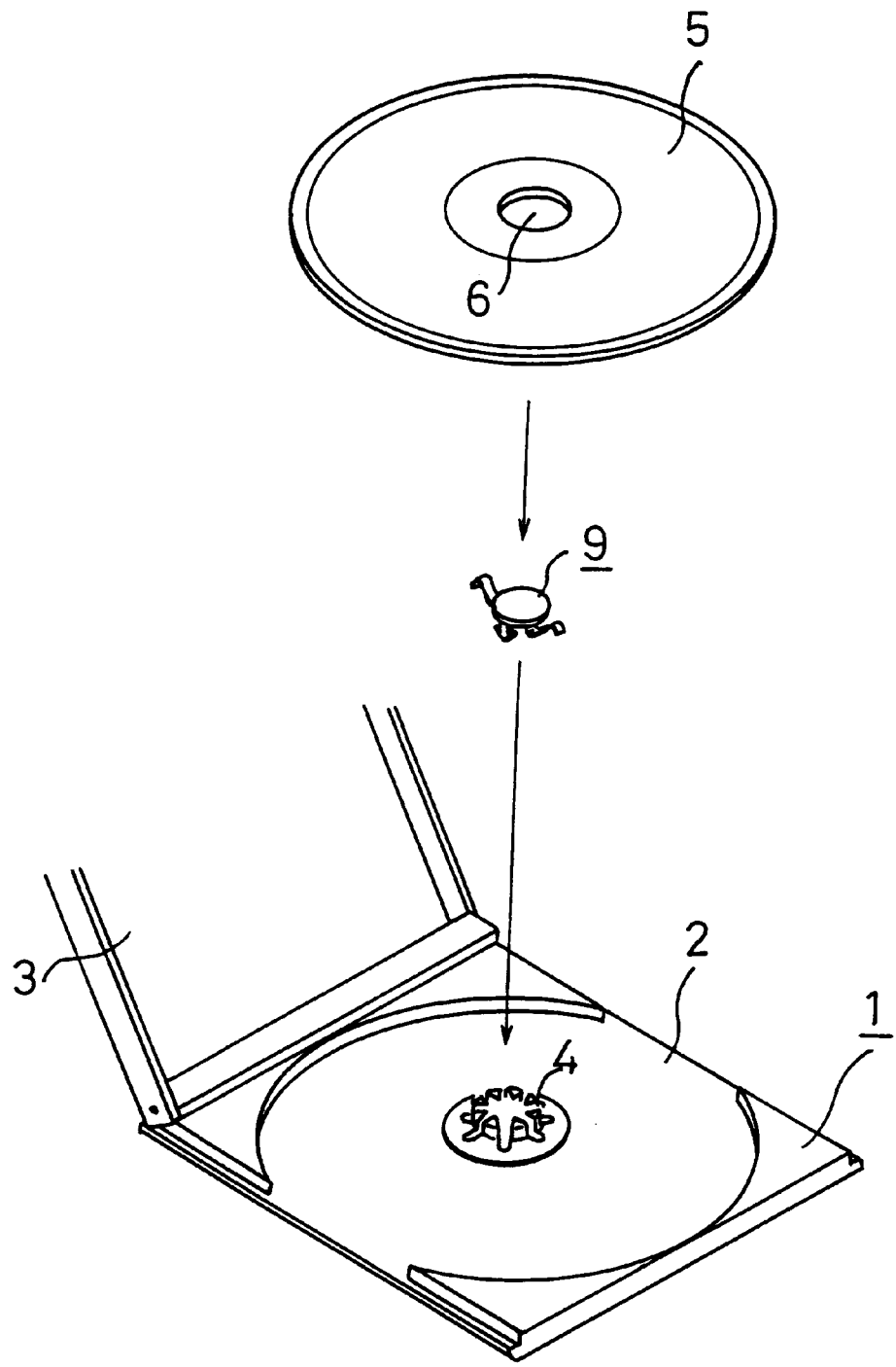
FIG. 1 is an exploded perspective view of one embodiment of the present invention.

Referring to FIG. 1, a case assembly for encasing a CD or CD-ROM 5 therein is shown generally at 1. For this case assembly, use may be made of CD, CD-ROM, and other cases which have so far been manufactured, marketed, and used as usual. To achieve the effect of the present invention, only the addition of a separate pusher 9 (to be described later) to a commercially available case designed for encasing the CD or CD-ROM 5 therein is needed.

The case assembly 1 comprises a substantially square form member 2 for receiving the CD or CD-ROM 5 and a lid member 3 to be fitted over the receiving member 2. By fitting the lid member 3 over the receiving member 2 it is possible to protect the CD or CD-ROM 5 encased therein.

The receiving member 2 is provided at its middle position with a piece 4 which is engaged within a center opening in the CD or CD-ROM 5 so that the CD or CD-ROM 5 is fixedly received on the receiving member 2.

The piece 4 may be formed in the form of an integral part of the receiving member 2. For instance, a substantially columnar piece 4 comprising a plurality of slits 7 and a plurality of projections 8 may be formed by press molding at a middle position of the receiving member 2, as shown in FIGS. 1 to 6.

Figure 2:
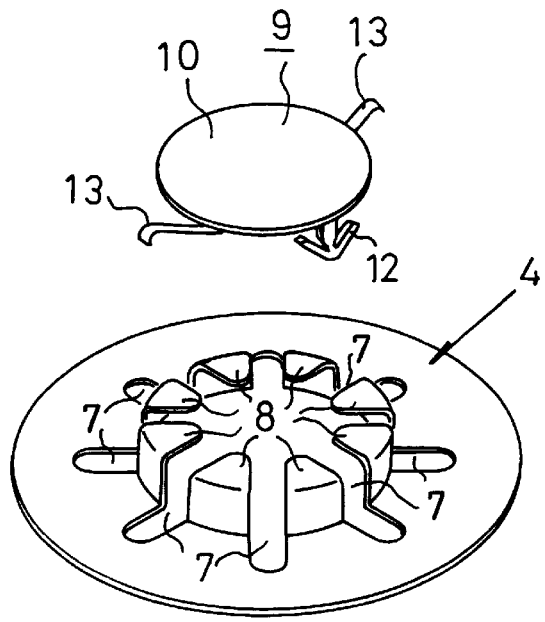
FIG. 2 is a view illustrative of how a pusher is used.
Figure 3:
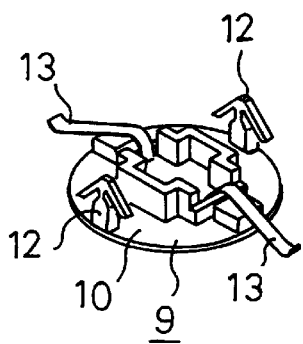
FIG. 3 is a view illustrative of the construction of the pusher, as viewed from the back side thereof.
Figure 4:
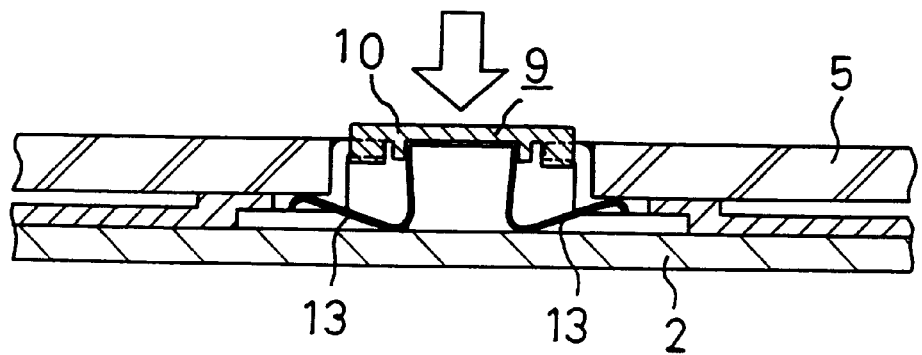
FIG. 4 is a view illustrative of how the present invention is applied.

A pusher 9 shown in FIG. 3 is attached to the piece 4. Referring here to a first embodiment of the pusher 9, it includes a disk form of pusher plate 10, as can be seen from FIGS. 2 and 3. Protuberances 12 and 12, each in an arrowhead form, extend from the back surface of the pusher plate 10. Each protuberance 12 passes through one slit 7 in the piece 4 and terminates at the back sides of adjacent projections 8. Thus, the pusher 9 is attached to the piece 4.

A strip 13 extends from the back surface of the pusher plate 10, and is upwardly bent toward its distal end, as shown in FIG. 2. Usually, two such strips 13 and 13 extend outwardly from the outer surface of the pusher plate 10.

The pusher 9 of the structure as explained above is attached to the piece 4, as shown in FIGS. 1 and 2.

If, in this case, the piece 4 has therein a sound generator designed to generate sound upon being pressed down, it is then possible to generate sounds of various tones whenever the pusher 9 is pressed down.

Figure 5:
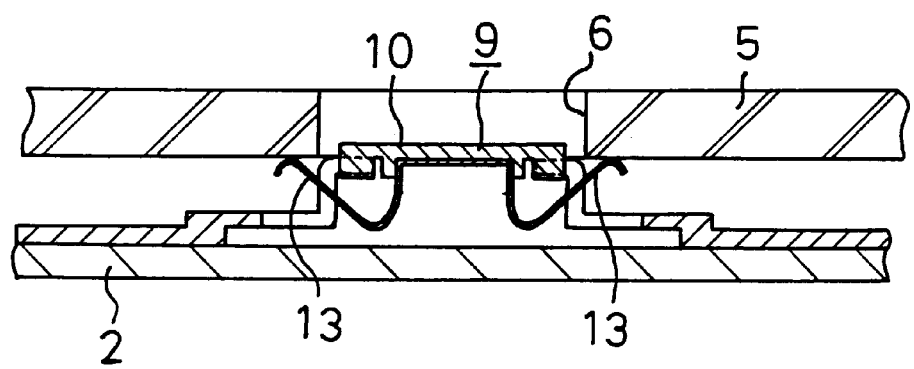
FIG. 5 is another view illustrative of how the present invention is applied.

While the CD or CD-ROM 5 is placed on the receiving member with the pusher 9 attached thereto, its center opening is fitted onto the piece 4. Removal of the CD or CD-ROM 5 from the case may be achieved by giving a push on the surface of the pusher plate 10 forming part of the pusher 9 (see FIG. 4). With a push given on the pusher plate 10, the widths of the slits 7 in the piece 4 become so narrow that the engagement of the piece 4 within the center opening 6 can be released. At this time, the strips 13 give an upward bias to the CD or CD-ROM 5 so that the CD or CD-ROM 5 can be smoothly detached from the piece 4, as shown in FIG. 5.

According to the aforesaid embodiment of the present invention, conventional CD or CD-ROM cases may be immediately used. Required in the practice of the present invention is only the attachment of the pusher 9 to a conventional CD or CD-ROM case.

Figure 6:
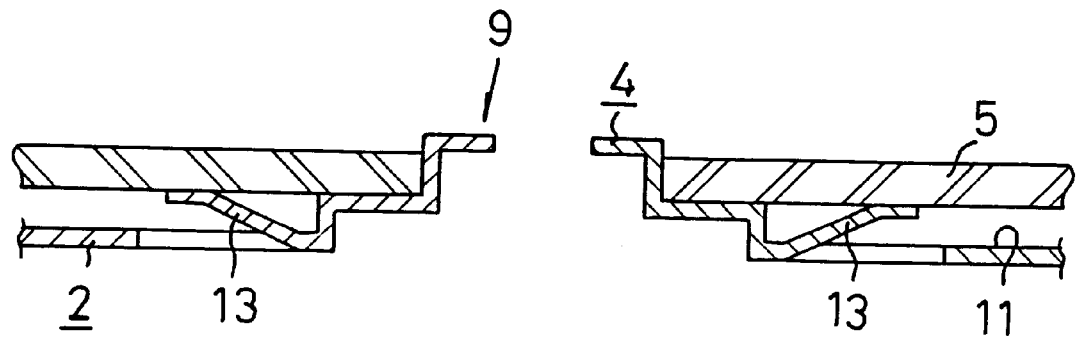
FIG. 6 is a sectional view of a general construction of a second embodiment of the present invention.
Figure 7:
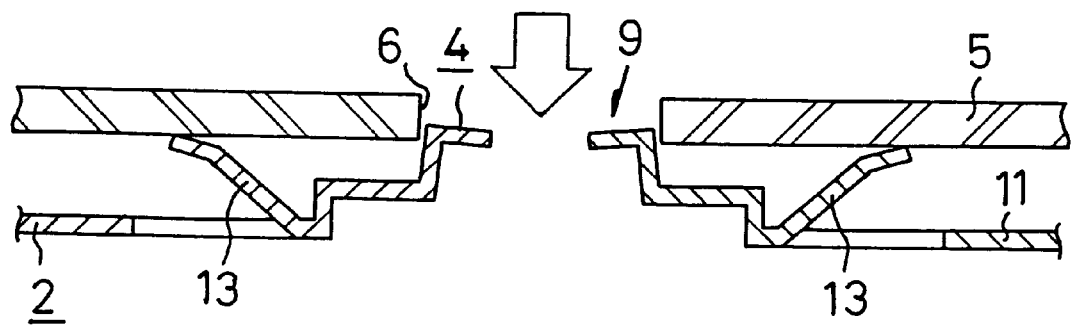
FIG. 7 is a view illustrative of how the second embodiment of the present invention is applied.

Another embodiment of the present invention will now be explained specifically with reference to FIGS. 6 and 7.

In accordance with this embodiment, a pusher 9 is located at a position of a receiving surface 11 of a receiving member 2 in the vicinity of a piece 4. More specifically, an upwardly extending tongue is cut out of the receiving surface 11 to form a strip 13.

This strip 13 is designed in such a manner that it constantly produces an upward bias. Upon a push given on the upper surface of the piece 4, the widths of slits 7 become so narrow that a CD or CD-ROM 5 can be lifted up by the biasing force of the strip 13 for its smooth removal.

It is noted that at least two such strips 13 are formed on the receiving surface of the receiving member 2.

It is also noted that this embodiment dispenses with a separate pusher 9 because the upper surface of the piece 4 itself acts as a pusher plate 10. Thus, some considerable cost reduction can be achieved.

According to the present invention, it is possible to remove CDs or CD-ROMS from cases in a one-touch fashion. The embodiments of the present invention are unlikely to cause damage to CDs or CD-ROMs or center openings therein.

While the present invention has been described with reference to some embodiments thereof, it is not intended that it be limited to the above description, but rather only to the extent set forth in the following claims. The embodiments of the invention in which an exclusive property or privilege is claimed are defined in the following claims.

What is claimed is:

1. A pusher to be attached in a case assembly, the case assembly having a disc receiving member and a lid member to be fitted over the disc receiving member, the disc receiving member having, at a substantially middle position thereof, a substantially columnar piece that is capable of being engaged within a center opening in the disc to fix the disc in place, the substantially columnar piece comprising a plurality of projections having a plurality of slits therebetween, and said projections forming a column and having a central clearance, said pusher comprising:

a disc form pusher plate that in use is to be placed on the projections to cover the central clearance, said pusher plate having a back surface;

at least one protuberance extending from said back surface of said pusher plate such that when said pusher plate is in use placed on the projections, said at least one protuberance extends from said back surface of said pusher plate through at least one of said slits so as to terminate at a back surface of at least one of said projections; and a strip extending from said back surface of said pusher plate, having a distal end, and bending upwardly toward said distal end such that, when said pusher plate is in use placed on the projections to cover the central clearance and said at least one protuberance extends from said back surface of said pusher plate through at least one of said slits so as to terminate at a back surface of at least one of said projections, when said pusher plate is pressed down said strip gives an upward bias to the disc so that it can be removed from case assembly.

2. The pusher of claim 1, wherein each said at least one protuberance comprises a central portion extending downward from said back surface of said pusher plate and a lateral portion extending laterally from said central portion such that when said pusher plate is in use placed on the projections, said central portion extends through one of said slits and said lateral portion terminates at a back surface of at least one of said projections.

3. The pusher of claim 2, wherein said lateral portion has an arrowhead shape pointing downward.

4. The pusher of claim 1, wherein said strip extends downward from said back surface of said pusher plate and extends radially outward and upward as said strip approaches said distal end thereof.

5. The pusher of claim 1, wherein said at least one protuberance comprises a plurality of protuberances spaced around the periphery of said back surface of said pusher plate.

6. The pusher plate of claim 4, and further comprising a second strip that extends downward from said back surface of said pusher plate and extends radially outward and upward as said strip approaches said distal end thereof such that when said pusher plate is pressed down both said strips give an upward bias to the disc so that it can be removed from case assembly.

7. A case assembly comprising:

a disc receiving member;

a lid member to be fitted over the disc receiving member;

a substantially columnar piece at a substantially middle position of said disc receiving member, said columnar piece being capable of being engaged within a center opening of a disc to fix the disc in place, said substantially columnar piece comprising a plurality of projections having a plurality of slits therebetween, said projections forming a column, and said disc receiving member having an annular disc receiving surface around a base of said columnar piece; and a pusher forming an integral part of said disc receiving member, said pusher providing a constant upward bias on a disc when a disc is mounted in said disc receiving member on said columnar piece, wherein when said columnar piece is pressed down, the disc is moved upwardly by said pusher providing said upward bias to help in removing the disc from said disc receiving member;

wherein said pusher comprises a plurality of strips spaced around said columnar piece and extending upwardly and radially outwardly with respect to said columnar piece such that, when the disc is on said columnar piece, said strips are pressed downward by the disc so as to provide said upward bias to the disc;

wherein said disc receiving member has cut out parts below said strips;

wherein said strips, when not engaged by the disc, extend to a point above said annular disc receiving surface.

8. The case assembly of claim 7, wherein said plurality of strips extend radially outwardly from a point below said annular disc receiving surface on said disc receiving member.

* * * * *